United States Patent Office 3,618,203
Patented Nov. 9, 1971

3,618,203
METHOD OF MAKING A GLASS OR CERAMIC-
TO-COMPOSITE METAL SEAL
Michael J. Pryor, Woodbridge, Conn., assignor to
Olin Mathieson Chemical Corporation
Filed Aug. 25, 1969, Ser. No. 852,775
Int. Cl. C03c 27/02; C21d 1/26; H01l 1/10
U.S. Cl. 29—588                      14 Claims

ABSTRACT OF THE DISCLOSURE

A composite metal product, glass or ceramic-to-metal seals using the composite, and the method of making these products. The composite has the properties of a low coefficient of expansion, approximating that of the glass or ceramic, good thermal conductivity, and fine grain size in the annealed condition. This is achieved by cladding an alloy having a low coefficient of expansion on either side of a low carbon steel core having a thermal conductivity of at least 20 B.t.u./sq. ft./ft./hr./° F. The thickness of the cladding on either side of the core not exceeding 33⅓% of the total thickness of the composite. The low carbon steel core contains up to 0.20% carbon and preferably up to 0.15% carbon and has a grain size of no more than 0.045 mm. after annealing of the composite. The composite is cold rolled at least 70% and preferably at least 80%, it is then annealed between about 1330° F. and 1600° F. and preferably between about 1500 F. and 1600° F., for no longer than 30 minutes and then rapidly cooled to room temperature. The heat-up rate must be faster than 100° F. per minute and preferably faster than 250° F. per minute. The seal is made by forming a cup shaped header having apertures, out of the composite. Electrical conductors are then inserted through the apertures and the cup is then filled with glass or ceramic to seal the conductors in place.

This invention relates to a method for producing a composite metal product for use in a glass or ceramic-to-metal seal. The composite has the properties of a low coefficient of expansion, approximating that of the appropriate glasses and ceramics, good thermal conductivity, and fine grain size in the annealed condition. This is achieved by processing a composite consisting especially of a cladding of an alloy having a low coefficient of expansion on either side of a low carbon steel core. The low carbon steel contains up to 0.20% carbon, and is processed so as to have a grain size of no more than 0.045 mm. and a thermal conductivity of at least 20 B.t.u./sq. ft./ft./hr./° F. after annealing of the composite.

Semi-conductor devices are normally mounted in hermetically sealed capsules to protect them from moisture and other contaminents. The devices are mounted on a metal header which has apertures through which electrical connections are passed. Glass or ceramic is used to provide a hermetic seal between the metal header and the electrical connections. Obviously, a close match of the coefficient of thermal expansion is required between the glass and the metal header. Such a match in coefficient of thermal expansion must be obtained somewhat below the solidification temperature of the glass and generally in the range of up to 500° C. This is important because the hermetic seal is generally manufactured by contacting the metal header with molten glass. The semi-conductor devices themselves are subject to a wide range of service temperatures between −190° C. and +100° C. The service temperatures may fluctuate widely and thereby result in the accumulation of thermal stresses due to differential expansion between the glass and the metal header. These accumulated stresses in turn can lead to fracture of the glass in the seal with a consequent loss of its hermetic properties.

Iron-nickel and iron-nickel-cobalt alloys with low coefficients of expansions are known to be useful as the metal headers. These headers, however, are improved by providing a core of a material having a better thermal conductivity than the low expansivity alloy alone. The resulting composite has improved thermal conductivity which aids in heat dissipation during sealing of the glass or ceramic to the metal header. The improved heat rejection during the glass-to-metal sealing operation enhances production rates and also gives longer life under conditions of fluctuating service temperatures. Composites for glass-to-metal seals made from oxygen-free-copper, clad on either side with Kovar have been proposed, in Pat. No. 3,351,700. It is also suggested in this patent that low carbon steel might be used for the core of the composite. However, the complicated shapes of which the seals are made require processing of the composite in the annealed condition. The annealing operation must not only soften the core alloy, but must also soften the cladding alloys which characteristically have annealing temperatures higher than those of the core alloy. This higher annealing temperature results in grain growth of the core alloy and therefore enlarged grain size. When cups of other complex shapes are formed of such composites, the core of which has such large grains, there is formed a large amount of coarse "orange peel." This is undesirable because of the poor dimensional tolerances which are obtained at the "orange peel" sections.

In copending application S.N. 641,228 to Pryor et al., now U.S. Pat. No. 3,546,363 assigned to the same assignee as the present invention, there is disclosed a novel composite for use in glass-to-metal seals comprising low coefficient of expansion alloys clad in equal thicknesses on either side of a copper alloy having a thermal conductivity of at least 90 B.t.u./sq. ft./ft./hr./° F., and a grain size no larger than 0.050 mm., after the composite has been fully annealed. Although an excellent coefficient of expansion match is obtained between this composite and the glass in the range of 500 to 700° C., a much poorer match in coefficient of expansion is found in the range of −190 to +100° C.

It is an object of this invention to provide a glass or ceramic-to-metal seal using a composite material wherein the composite has a low coefficient of expansion which more closely matches that of the glass or ceramic between −190 and +100° C.

It is another object of the present invention to provide a composite whose thermal conductivity is at least 13 B.t.u./sq. ft./ft./hr./° F., and is greater than that of the solid low coefficient of expansion metal clad alone.

It is another object of the present invention to provide a composite product which has an average grain size no greater than 0.045 mm. in diameter and which avoids the formation of "orange peel" after forming operations.

It is another object of this invention to provide a process which will result in an annealed composite product which has good dimensional tolerances after forming into a complex shape.

It is another object of this invention to provide a process for obtaining a composite product which contains a low carbon steel core having an average grain size no greater than 0.045 mm. in diameter and a thermal conductivity of at least 20 B.t.u./sq. ft./ft./hr./° F., when the composite is in the annealed condition.

Other objects of this invention will be apparent from the following disclosure.

The starting material for the process of the present invention is a composite containing a low expansion alloy clad on either side of a core of a low carbon steel containing up to 0.20% carbon. The low carbon steel also contains up to 1.0% manganese, up to 0.50% silicon, up to 0.06% phosphorus, and up to 0.06% sulfur. In addition, it may contain aluminum, titanium, columbium or other grain refining elements in effective amounts to further reduce the grain size of the low carbon steel. The preferred low carbon steel core alloy contains up to 0.15% carbon, up to 0.50% manganese, up to 0.30% silicon, and up to 0.05% phosphorus and sulfur.

The cladding thickness on either side of the core should not exceed 33⅓% of the total thickness of the composite. The grain size of the steel core after annealing should not exceed an average of 0.045 mm. in diameter. The thermal conductivity of the composite should not be less than 13 B.t.u./sq. ft./ft./hr.° F. at maximum cladding thickness.

Alloys to be used for cladding both sides of the low carbon steel core are iron containing alloys having a coefficient of thermal expansion equal to or near that of glass or ceramic which is to be sealed to the composite. Thus, in general, alloys having a coefficient of thermal expansion in the range of 1 to $150 \times 10^{-7}$ in./in./° F. may be utilized.

Exemplary alloys which may be used for the clad, together with their chemical composition in percent by weight and their coefficient of thermal expansion are shown in Table I. However, it is to be understood that the alloys in the table are given by way of example only and that the invention is not to be construed as limited to the alloys given in the table.

between about 1330° F. and 1600° F. and preferably between about 1500° F. and 1600° F. The heat up rate must be faster than 100° F. per minute and preferably faster than 250° F. per minute. The time at the annealing temperature must be no longer than 30 minutes and may be as short as 0.5 minute. The limitations with respect to the percent cold work, annealing temperature, heat up rate and time at temperature are in every sense critical for obtaining the necessary fine grain size of 0.045 mm. This fine grain size, in turn, is required for avoiding the "orange peel" effect.

An example of the method of producing the glass-to-metal seal according to the present invention follows. However, it is to be understood that structural limitations are only exemplary, and that many other novel and different structural configurations may be devised.

Figure 1:
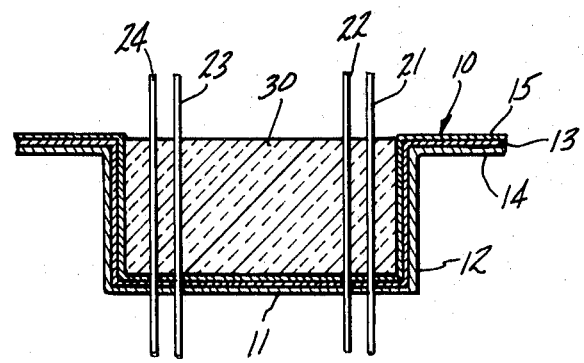
FIG. 1 is a sectional view of a first assembly stage of fabrication.

As can be seen from FIG. 1, a composite 10 made of a low carbon steel core 13 clad and bonded on both sides at 14 and 15 as previously described, is heat treated as described hereinbefore, and is then formed, for example by drawing, into a cup shaped header having a flange as shown at 10, a circular wall portion 12 and a base portion 11. The header can be accurately dimensioned due to the fine grain size of the low carbon steel core. Wires 21, 22, 23, and 24 made of electrically conductive material such as nickel or Kovar pass through openings in the base part

TABLE I

| Alloy | Nominal composition, wt. percent | Coefficient of thermal expansion (in./in./° F.$\times 10^{-7}$) |
|---|---|---|
| Super Invar | 64 Fe, 31 Ni, 5 Co | 2.5 |
| Invar (Nilvar) | 64 Fe, 36 Ni | 4.5 |
| Elinvar | 53–61 Fe, 33–35 Ni, 4–5 Cr, 1–3 W, 0.5–2 Mn, 0.5–2 Si and 0.5–2 C | 30–50 |
| Platinite | 54 Fe, 46 Ni | 41 |
| Kovar (Rodar, Fernico) | 54 Fe, 29 Ni, 17 Co | 41 |
| Eligiloy (Octanium) | 40 Co, 20 Cr, 15 Ni, 15 Fe, 7 Mo, 2 Mn, 0.15 C, 0.3 Be, and 0.5 incidental impurities | 71 |

The processing of the composite may be as follows. The clad alloy is metallurgically bonded to both sides of the core. The bonding may be carried out, for example, by following the teaching of Winter, U.S. Pat. No. 3,397,045, or by following Rader-Goldman-Winter, U.S. application S.N. 549,319, both assigned to the same assignee as the present invention, or according to any other method of forming a sound metallurgical bond between the core and the clad.

The method of cladding is not very critical as long as a strong metallurgical bond, required for good heat transfer, is obtained between both sides of the low carbon steel core and the clad.

In the case of composites with a low carbon steel core, the green bond is formed with a rolling reduction greater than 60%, with a subsequent rolling reduction of at least an additional 25% to give a total reduction of at least 70%.

It is critical that the composite must be cold worked at least 70% prior to annealing, and preferably at least 80%. The critical cold working may occur during the bonding process.

After the composite has been cold rolled the critical amount, it is subjected to an annealing, in a nonoxidizing atmosphere. The nonoxidizing atmosphere may be provided by annealing in a vacuum, annealing in an inert gas or preferably the annealing may be done in an atmosphere of disassociated ammonia which may contain, for example, 25% nitrogen—75% hydrogen or as another example, 90% nitrogen—10% hydrogen.

The annealing treatment is critical for obtaining the fine grain size, the anneal comprises heating the composite 11 of the composite header. After these wires are placed in position, a glass or ceramic in the molten state is poured into the header. It is then allowed to solidify at 30.

The specific glass or ceramic used will vary according to the particular application, however, glasses of the type sodium-aluminum-borosilicates are commonly used in this application.

Figure 2:
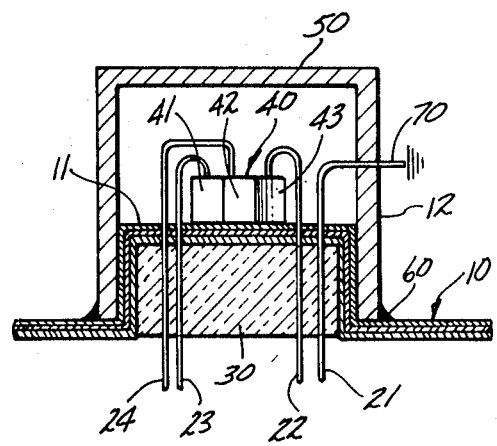
FIG. 2 is a sectional view of a completed composite assembly seal.

As shown in FIG. 2, the thus formed article is inverted and a semi-conductor device such as a transistor 40, which may be made, for example, of silicon or germanium, having an emitter 41, a base 42 and a collecter 43 is then placed upon and conventionally affixed to the composite base portion 11. Three of the leads 23, 24, and 22 are connected to the respective base, emitter, and collecter portions. A metal cap 50 is then snugly fit around the circular wall portion 12 of the composite and it is resistance-welded at 60 to the composite. The cap 50 may be made of any appropriate metal or alloy, for instance, of nickel, or Kovar alloy (see Table I), or the composite of this invention.

The remaining wire may be grounded either to the metal cap or to a connection passing through the cup, appropriately hermetically sealed.

It is thus seen that the process of the present invention results in an efficient glass-to-metal seal. It has a coefficient of expansion approximating that of the glass or ceramic 30. It has good thermal conductivity for heat rejection. It effectively seals the interior of the structure shown in FIG. 2 from the atmosphere.

The following examples are submitted for illustrative purposes but are not to be construed as limiting the invention.

EXAMPLE I

A metallurgically bonded composite was prepared by cladding 0.010" thick Kovar on both sides of a 0.080" thick A.I.S.I. 1010 low carbon steel core containing 0.10% carbon. Bonding was effected by a single cold reduction of 75%, yielding a metallurgically bonded composite 0.025" thick. This composite was cold rolled 40% to 0.015" thickness where the cladding was 0.0015" on both sides and core was 0.012" thick. The composite was annealed at 1750° F. for 10 minutes in an atmosphere of cracked ammonia and cooled to room temperature in the same atmosphere. The heat up rate and the cooling rate were 500° F. per minute. The steel core showed an average grain size of 0.15 mm. The composite had a tensile strength of 72,000 p.s.i., a yield strength at 0.2% offset of 34,000 p.s.i. and an elongation of 35%. The composite was formed into the composite cups with very severe formation of "orange peel."

EXAMPLE II

The same composite material as in Example I was annealed in cracked ammonia at 1550° F. for 10 minutes with a heat up rate and cooling rate of 500° F. per minute. The steel core of the annealed composite showed an average grain size of 0.020 mm. It had a tensile strength of 74,000 p.s.i., a yield strength at 0.2% offset of 36,000 p.s.i. and an elongation of 29%. The composite was formed into composite cups, as in Example I, but without any evidence of "orange peel." Kovar wires were sealed with glass into the cups without developing leaks. Semiconductor devices were assembled using the composite glass-to-metal seals. These assemblies were subjected to rapid temperature cycling from −190° C. to +100° C. without developing leaks.

The above examples are illustrative of the critical nature of the heat treatment of the invention for obtaining the fine grain size in the core alloy of the composite, which in turn is necessary to eliminate "orange peel" effect.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope of the invention.

What is claimed is:

1. A glass or ceramic-to-metal seal assembly comprising:
   a cup shaped metal header having apertures therein for passage of electrical conductors therethrough, said header and said conductors being adapted to form a seal with a glass or ceramic, said header being formed of a composite comprising:
   a low carbon steel core containing up to 0.20% carbon, having a grain size not greater than 0.045 mm. and a thermal conductivity of at least 20 B.t.u./sq. ft./ft./hr./° F., and a cladding alloy having a coefficient of expansion substantially equal to the glass or ceramic with which the composite is to be used, metallurgically bonded on both sides of the core, the thickness of said cladding on either side of said core not exceeding 33⅓% of the total thickness of the composite, said composite having been cold worked at least 70%,
   electrical conductors having a coefficient of expansion substantially equal to said glass or ceramic being inserted through the apertures in said header,
   a mass of said glass or ceramic at least partially filling said cup and surrounding said conductors, thereby sealing said conductors in place, said glass or ceramic being hermetically sealed to said header and said conductors.

2. An assembly according to claim 1 wherein said cup shaped header includes a base portion, and a flange portion connected by a circular wall portion.

3. An assembly according to claim 2 wherein a semiconductor device is affixed to the base portion of said composite header cup, and in which a cap engaging the walls of said composite header cup is welded to the flange portion of said cup.

4. An assembly according to claim 1 wherein the low carbon steel core contains up to 0.15% carbon, and the composite has a thermal conductivity of at least 13 B.t.u./sq. ft./ft./hr./° F.

5. A process for making a composite, for use in a glass or ceramic-to-metal seal, wherein the composite comprises, a low carbon steel core, containing up to 0.20% carbon and having a grain size not greater than 0.045 mm. and a thermal conductivity of at least 20 B.t.u./sq. ft./ft./hr./° F., and a clad having a coefficient of expansion approximating that of the glass to which the composite is to be sealed, the cladding on either side of said core not exceeding 33⅓% of the total thickness of said composite, comprising the steps of:
   bonding said low carbon steel core to said clad,
   cold working the resulting composite at least 70%, wherein said 70% cold working may include any cold working performed during the bonding,
   annealing said composite by heating it to a temperature between about 1330° F. and 1600° F., said composite being heated up to the annealing temperature at a rate faster than 100° F. per minute, in a nonoxidizing atmosphere, for a period no longer than 30 minutes, and cooling the composite to room temperature.

6. A process according to claim 5 wherein the composite is cold worked at least 80%.

7. A process according to claim 6 wherein the composite is annealed at a temperature between about 1500° F. and 1600° F.

8. A process according to claim 5 wherein the composite is heated up to the annealing temperature at a rate faster than 250° F. per minute.

9. A process according to claim 8 wherein the composite is rapidly cooled to room temperature.

10. A process according to claim 9 wherein the composite is cooled at a rate faster than 250° F. per minute.

11. A process for preparing a glass or ceramic-to-metal seal wherein the metal is a composite comprising, a low carbon steel core containing up to 0.20% carbon and having a grain size no greater than 0.045 mm. and a thermal conductivity of at least 20 B.t.u./sq. ft./ft./hr./° F., and a clad having a coefficient of expansion approximating that of said glass or ceramic, said clad on either side of the core not exceeding 33⅓% of the total thickness of the composite, the process comprising:
   bonding said low carbon steel core to said clad,
   cold working the resulting composite at least 70%,
   annealing said composite by heating it to a temperature between about 1330° F. and 1600° F., said composite being heated up to the annealing temperature at a rate faster than 100° F. per minute, in a nonoxidizing atmosphere, for a period no longer than 30 minutes, and cooling the composite to room temperature,
   forming a cup shaped header of said cold worked and annealed composite,
   forming apertures in said header adapted for passage of electrical conductors therethrough,
   inserting electrical conductors through said apertures in said header,
   and at least partially filling said cup with said glass or ceramic so as to seal said conductors in place, said glass or ceramic being hermetically sealed to said header and said conductors.

12. A process as in claim 11 wherein said cup shaped header comprises a base portion, and a flange portion connected by a circular wall portion.

13. A process according to claim 12 wherein a semiconductor device is affixed to the base portion of said cup shaped header.

14. A process according to claim 13 wherein a cap is provided which engages the walls of said composite cup header and is welded to the flange portion of said cup.

References Cited

UNITED STATES PATENTS

| | | | |
|---|---|---|---|
| 2,753,623 | 7/1956 | Boessenkool et al. | 29—497.5 |
| 3,351,700 | 11/1967 | Savolainen et al. | 174—50.61 |

OTHER REFERENCES

Zbigniew D. Jastrzebski, Nature and Properties of Engineering Materials, 1959, John Wiley & Sons Inc., pp. 256–257.

S. LEON BASHORE, Primary Examiner

S. R. FRIEDMAN, Assistant Examiner

U.S. Cl. X.R.

29—472.9, 480, 497.5, 498; 65—59; 148—11.5 R; 174—50.56, 50.63